(12) United States Patent
Sherman (10) Patent No.: US 9,110,752 B2
(45) Date of Patent: Aug. 18, 2015

(54) ENTERPRISE PORTAL MOBILE APPLICATIONS INSTALLS

(75) Inventor: Yahali Sherman, Tel Aviv (IL)

(73) Assignee: SAP Portals Israel Ltd, Ra'anana (IL)

( * ) Notice: Subject to any disclaimer, the term of this patent is extended or adjusted under 35 U.S.C. 154(b) by 83 days.

(21) Appl. No.: 13/546,825

(22) Filed: Jul. 11, 2012

(65) Prior Publication Data

US 2014/0019958 A1    Jan. 16, 2014

(51) Int. Cl.
*G06F 9/445* (2006.01)

(52) U.S. Cl.
CPC ........................................ *G06F 8/61* (2013.01)

(58) Field of Classification Search
USPC ........................................................ 717/178
See application file for complete search history.

(56) References Cited

U.S. PATENT DOCUMENTS

| | | | |
|---|---|---|---|
| 6,434,513 B1 | 8/2002 | Sherman et al. | |
| 7,711,359 B2 * | 5/2010 | Netanel et al. | 455/419 |
| 8,359,016 B2 * | 1/2013 | Lindeman et al. | 455/414.1 |
| 8,360,975 B1 * | 1/2013 | Schwieterman et al. | 709/225 |
| 8,543,656 B2 * | 9/2013 | Khoo | 709/206 |
| 8,798,612 B2 * | 8/2014 | Satake et al. | 455/419 |
| 2002/0111848 A1 * | 8/2002 | White | 705/10 |
| 2002/0161553 A1 | 10/2002 | Har'El et al. | |
| 2002/0164983 A1 * | 11/2002 | Raviv et al. | 455/432 |
| 2009/0069954 A1 * | 3/2009 | Aladesuyi | 701/2 |
| 2010/0146051 A1 * | 6/2010 | Agrawal et al. | 709/204 |
| 2010/0269108 A1 * | 10/2010 | Boudreau et al. | 717/178 |
| 2010/0304731 A1 * | 12/2010 | Bratton et al. | 455/420 |
| 2011/0088046 A1 | 4/2011 | Guertler et al. | |
| 2011/0113358 A1 * | 5/2011 | Nielsen et al. | 715/765 |
| 2011/0137909 A1 | 6/2011 | Guertler et al. | |
| 2011/0145036 A1 * | 6/2011 | Herschmann et al. | 705/7.23 |
| 2011/0177799 A1 * | 7/2011 | Ramer et al. | 455/414.1 |
| 2011/0185354 A1 * | 7/2011 | Tanner et al. | 717/178 |
| 2011/0214117 A1 * | 9/2011 | Hattori et al. | 717/173 |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0132420 A1 | 5/2013 | Vainer et al. | |

(Continued)

OTHER PUBLICATIONS

Chan et al. "A framework to develop an enterprise information portal for contract manufacturing", 2002, Elsevier Science.*

(Continued)

*Primary Examiner* — Anna Deng
*Assistant Examiner* — Junchun Wu
(74) *Attorney, Agent, or Firm* — Fish & Richardson P.C.

(57) ABSTRACT

The disclosure generally describes computer-implemented methods, software, and systems for resolving issues with applications accessed through portals. A computer-implemented method includes providing an enterprise portal page to a mobile device including at least one link associated with a native mobile device application; identifying an issue associated with activation of the at least one link associated with the native mobile device application within the enterprise portal page, where the issue results from the native application being unavailable at the mobile device; identifying a device type of the mobile device on which the issue occurred; and providing information for resolving the issue to a user interface on the mobile device to correct the issue, including at least one suggested link for downloading the native mobile device application associated with the identified issue, the at least one suggested link is selected based on the identified issue and the identified device type.

18 Claims, 3 Drawing Sheets

(56) References Cited

U.S. PATENT DOCUMENTS

| | | |
|---|---|---|
| 2013/0144957 A1 | 6/2013 | Sherman et al. |
| 2013/0159926 A1 | 6/2013 | Vainer et al. |
| 2013/0174223 A1* | 7/2013 | Dykeman et al. .................. 726/4 |
| 2013/0227422 A1* | 8/2013 | Lehmann et al. .............. 715/738 |
| 2013/0239021 A1* | 9/2013 | Feinberg et al. .............. 715/753 |
| 2013/0260734 A1* | 10/2013 | Jain et al. ...................... 455/418 |
| 2014/0007222 A1* | 1/2014 | Qureshi et al. .................. 726/16 |
| 2014/0013000 A1 | 1/2014 | Vainer et al. |

OTHER PUBLICATIONS

Gant et al. "Web Portals and Their Role in E-Government", Dec. 31, 2001, AMCIS.*

* cited by examiner

ENTERPRISE PORTAL MOBILE APPLICATIONS INSTALLS

TECHNICAL FIELD

The present disclosure relates to computer-implemented methods, software, and systems for installing native mobile device applications.

BACKGROUND

Enterprise portals are frameworks for integrating information, people and processes across organizational boundaries. Portals can provide a secure unified access point, often in the form of a web-based user interface, and are designed to aggregate and personalize information through application-specific portlets and components. One hallmark of enterprise portals is the decentralized content contribution and content management, which keeps the information always updated. In many cases, specific portal pages may be defined by a highly experienced administrator using a portal content administration environment or a key user within a particular organization using specific tools to define aspects, relationships, and connections for and between content provided within specific portal pages.

SUMMARY

The disclosure generally describes computer-implemented methods, software, and systems for resolving issues with applications accessed through portals. A computer-implemented method providing an enterprise portal page to a mobile device including at least one link associated with a native mobile device application. An issue is identified that is associated with activation of the at least one link associated with the native mobile device application within the enterprise portal page. The issue results from the native application being unavailable at the mobile device. A device type of the mobile device on which the issue occurred is identified. Using one or more processors, information is provided for resolving the issue to a user interface on the mobile device. The information is configured to correct the issue on the mobile device. The information includes at least one suggested link for downloading the native mobile device application associated with the identified issue. The at least one suggested link is selected, at least in part, based on the identified issue and the identified device type.

The present disclosure relates to computer-implemented methods, software, and systems for optimizing enterprise portal smart worklists. One computer-implemented method includes: providing an enterprise portal page to a mobile device including at least one link associated with a native mobile device application; identifying an issue associated with activation of the at least one link associated with the native mobile device application within the enterprise portal page, where the issue results from the native application being unavailable at the mobile device; identifying a device type of the mobile device on which the issue occurred; and providing, using one or more processors, information for resolving the issue to a user interface on the mobile device, wherein the information is configured to correct the issue on the mobile device, the information including at least one suggested link for downloading the native mobile device application associated with the identified issue, wherein the at least one suggested link is selected, at least in part, based on the identified issue and the identified device type.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, identifying the issue includes receiving an error within the portal page.

In a second aspect combinable with any of the previous aspects, the information includes a corrective action message and instructions.

In a third aspect combinable with any of the previous aspects, the instructions are tailored to the device type.

In a fourth aspect combinable with any of the previous aspects, the identified issue is typically an issue associated with an application typically not available at the mobile device.

In a fifth aspect combinable with any of the previous aspects, the providing information occurs instead of providing an error message, the error message not including information for resolving the issue.

In a sixth aspect combinable with any of the previous aspects, the at least one suggested link corresponds to an application store system corresponding to at least one of the identified device type.

In a seventh aspect combinable with any of the previous aspects, the device type includes identifying a model of the device and a current operating system associated with the device.

In an eighth aspect combinable with any of the previous aspects, downloading the native mobile device application includes downloading from a location accessible within the enterprise portal or a related system.

In a ninth aspect combinable with any of the previous aspects, the links initially provided are based at least in part on one or more roles of a user associated with the mobile device.

In a tenth aspect combinable with any of the previous aspects, the downloading the native application includes using access rights to perform a corresponding download.

In an eleventh aspect combinable with any of the previous aspects, the method further comprises: determining information for resolving issues for each of plural combinations of native mobile device applications and device types and storing the information at a time before the activation of the at least one link.

The subject matter described in this specification can be implemented in particular implementations so as to realize one or more of the following advantages. First, issues such as missing applications can be resolved automatically. Second, missing applications that are downloaded can be identified based on the user's identity, role and device.

The details of one or more implementations of the subject matter of this specification are set forth in the accompanying drawings and the description below. Other features, aspects,

DESCRIPTION OF DRAWINGS

Like reference numbers and designations in the various drawings indicate like elements.

DETAILED DESCRIPTION

This disclosure generally describes computer-implemented methods, software, and systems for resolving issues associated with using native applications selected for execution using links in an enterprise portal. Native applications that execute on mobile devices can be initiated in response to a user selecting or otherwise activating links within an enterprise portal page. The links available to the user can depend on one or more roles that the user has within the enterprise system. Applications can be launched from links within particular portal pages. For example, links can be used to attempt to launch native applications on mobile devices. Usually, a user may select a link, and the native application will execute as planned. In some cases, selection of the link will fail, or another issue may occur. For example, if the native application is missing at the time that an attempt to launch that application occurs (e.g., the link is "broken"), then the portal can automatically generate instructions that the user can use to download the missing native application. In some implementations, the instructions can be based, at least in part, on an identification of the user, the user's one or more roles within the enterprise system, and the user's device type, among other suitable parameters. For example, the user's identity, roles, device type, etc., can determine an aggregation of links to native applications that the user may run on that device. An instruction on how to correct a failure in which a specific application is not installed on that device and the link is "broken" can be determined based on which native application that the user tried to run (e.g., "approve vacation") and which device is being using. The device and application can determine what the installation instruction would be. For example, the installation instruction can display an error page that informs the user that the application is not installed on his device, and suggest to install the application and, if the user approves, navigating to the application store page of that application. Implementations of the subject matter of this disclosure can pertain to any native applink on any web page, e.g., as long as a link handler exists on or is associated with that web page.

For the purposes of this disclosure, an enterprise portal, also known as an enterprise information portal (EIP) or a corporate portal, is a framework for integrating information, people, and processes across organizational boundaries. The enterprise portal provides a secure unified access point, often in the form of a Web-based user interface, and is designed to aggregate and personalize information through application-specific portals. The enterprise portal is the de-centralized content contribution and content management system, which keeps the information always updated. With only a Web browser, users can begin work once they have been authenticated in the portal which offers a single point of access to information, enterprise applications, and services both inside and outside an organization. Portals may present information from diverse sources in a unified and structured way, and provide additional services, such as dashboards, an internal search engine, e-mail, news, enterprise portal navigation tools, and various other features. Portals are often used by enterprises for providing their employees, customers, and possibly additional users, with a consistent look and feel, and access control and procedures for multiple applications, which otherwise would have been separate entities altogether. The multiple applications can include payroll, accounting, customer resource management, purchasing/sales, inventory, business objects, or any other applications and/or systems or an enterprise system For the purposes of this disclosure, a business object can be considered a representation of a business entity, such as an employee, a sales order, an invoice, a financial report, etc. The business object may encompass both functions, for example, in the form of methods, and data, such as one or more properties. For example, business objects may reduce system complexity by reducing a system into smaller units. The implementation details of business objects are typically hidden from a non-development user and may be accessed through the defined functions and encapsulated data. Business objects also form a point of entry of the functions and data of a system and enable the system to easily share, communicate, display, or otherwise operate with other systems.

Generally, through a graphical user interface (GUI), an enterprise portal user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI may represent any graphical user interface, including but not limited to, a Web browser, a touch screen, or a command line interface (CLI) that processes information and efficiently presents the information results to the user. In general, a GUI may include a plurality of user interface (UI) elements, some or all associated with a Web browser, such as interactive fields, pull-down lists, and buttons operable by the enterprise portal user. These and other UI elements may be related to or represent the functions of the Web browser.

Figure 1:
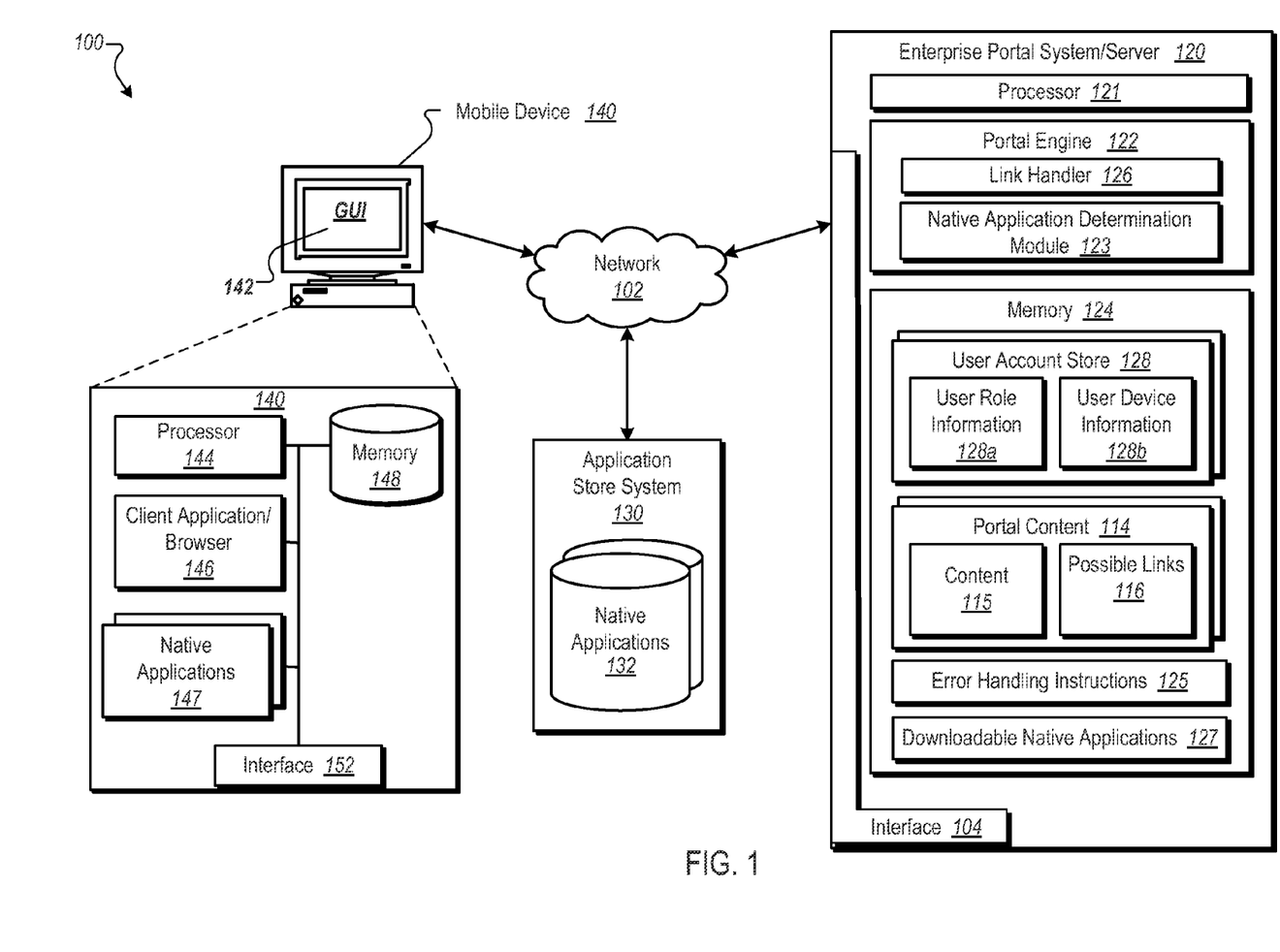
FIG. 1 is a block diagram illustrating an example environment for resolving issues associated with native applications launched from an enterprise portal.

FIG. 1 illustrates an example environment 100 for resolving issues associated with native applications launched from an enterprise portal. Specifically, the illustrated environment 100 includes, or is communicably coupled with, an enterprise portal system/server 120, a mobile device 140 by which a user can access resources of the enterprise portal system/server 120, and one or more application store systems 130. For example, a user using the mobile device 140 may access and use resources on the enterprise portal system/server 120 that are related to payroll, accounting, customer resource management, purchasing/sales, inventory, business objects, or any other applications and/or systems or an enterprise system. In some instances, mobile devices 140 may interact with mobile-optimized versions of one or more portal pages associated with the enterprise portal system/server 120. For example, as a result of accessing an enterprise portal page on enterprise portal system/server 120 via the mobile device 140, a corresponding native application 147 for use or execution locally on the mobile device 140 can be activated. Ideally, the native application will execute as planned. However, if an issue or other failure occurs (e.g., the required native application 147 does not exist on the mobile device 140), then a corresponding native application 132 can be downloaded from the appropriate application store system 130 (or other suitable location, e.g., the particular downloadable native application 127) using instructions from the enterprise portal system/server 120.

In general, the enterprise portal system/server 120 is a system/server that includes one or more pages associated with the enterprise portal, and that can be interfaced by the mobile device 140 to interact with the portal pages. For example, user selections made on enterprise portal system/server 120 determine at least a portion of the native applications 147 that execute on the mobile device 140. In some implementations, the enterprise portal system/server 120 may comprise a Web server, where the native applications 147 represent one or more Web-based applications accessed and executed by the mobile device 140 via the network 102. In some implementations, the native applications 147 execute on the mobile device 140 and/or at the enterprise portal system/server 120 to perform the programmed tasks or operations of the native applications 147. In some implementations, the portal page is a specific example of, more generally, portal content. For example, the portal content can come from a portal role in the form of an AJAX call (e.g., including XML or JSON format) and be rendered into a page on the client.

At a high level, the enterprise portal system/server 120 comprises an electronic computing device operable to receive, transmit, process, store, or manage data and information associated with the environment 100. Specifically, the enterprise portal system/server 120 illustrated in FIG. 1 is responsible for providing links that are selectable by a user on the mobile device 140. Upon selection of a particular link, the native application 147 associated with the link normally executes on the mobile device 140.

As used in the present disclosure, the term "computer" is intended to encompass any suitable processing device. For example, although FIG. 1 illustrates a single enterprise portal system/server 120, the environment 100 can be implemented using two or more enterprise portal system/servers 120, as well as computers other than servers, including a server pool. Indeed, the enterprise portal system/server 120 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated enterprise portal system/server 120 may be adapted to execute any operating system, including Linux, UNIX, Windows, Mac OS®, Java™, Android™, iOS or any other suitable operating system. According to one implementation, the enterprise portal system/server 120 may also include, or be communicably coupled with, an e-mail server, a Web server, a caching server, a streaming data server, and/or other suitable server.

The enterprise portal system/server 120 also includes an interface 104, a portal engine 122, and a memory 124. The interface 104 is used by the enterprise portal system/server 120 for communicating with other systems in a distributed environment—including within the environment 100—connected to the network 102 (e.g., the mobile device 140), as well as other systems (not illustrated) communicably coupled to the network 102. Generally, the interface 104 comprises logic encoded in software and/or hardware in a suitable combination and operable to communicate with the network 102. More specifically, the interface 104 may comprise software supporting one or more communication protocols associated with communications such that the network 102 or interface's hardware is operable to communicate physical signals within and outside of the illustrated environment 100.

As illustrated in FIG. 1, the enterprise portal system/server 120 includes a processor 121. Although illustrated as a single processor 121 in FIG. 1, two or more processors 121 may be used according to particular needs, desires, or particular implementations of the environment 100. Each processor 121 may be a central processing unit (CPU), a blade, an application specific integrated circuit (ASIC), a field-programmable gate array (FPGA), or another suitable component. Generally, the processor 121 executes instructions and manipulates data to perform the operations of the enterprise portal system/server 120. The processor 121 also interprets state and status information. For example, the processor 121 components can interpret error codes associated with launching native applications, e.g., through JavaScript, etc., as to what the issue is (e.g., if the native application 147 is missing). The processor 121 components can also perform an automatic analysis to determine what should be provided (e.g., download the missing native application 147). Specifically, the processor 121 executes the functionality required to receive and respond to requests from the mobile device 140.

The enterprise portal system/server 120 includes a portal engine 122 which is an application that provides portal-related functionality, e.g., for users of mobile devices 140. Operations of the portal engine 122 are executed by the processor 121. The portal engine 122 includes a link handler 126 and a native application determination module 123. The link handler 126 is a program, application, module, or other software that handles links within the portal content 114. Handling links can include executing a link when the link is selected by the user, e.g., by selecting the portal content 114 that includes or is associated with the link. For example, the link executed by the link handler 126 can be associated with the native application determination module 123, which can figure out which native application 147 should be executed based on user's role(s) and device type. Handling links can also include handling link-related errors within the portal. For example, the link handler 126 can watch for and handle errors associated with the link. Upon the occurrence of a problem executing the link, for example, the link handler 126 can access information about the user in the user account store 128 in association with the particular error code/information, and then suggest, for the failed native application 147, one or more links for downloading the native application 147. For example, the links can be directed to downloading native applications 132 from a particular application store system 130.

The enterprise portal system/server 120 also includes a memory 124, or multiple memories 124. The memory 124 may include any type of memory or database module and may take the form of volatile and/or non-volatile memory including, without limitation, magnetic media, optical media, random access memory (RAM), read-only memory (ROM), removable media, or any other suitable local or remote memory component. The memory 124 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the enterprise portal system/server 120. Additionally, the memory 124 may include any other appropriate data, such as VPN applications, firmware logs and policies, firewall policies, a security or access log, print or other reporting files, as well as others.

The memory 124 includes at least one user account store 128 (e.g., at least one user account store 128 for each user), multiple pages and/or instances of portal content 114, and error handling instructions 125. Other components within the memory 124 are possible.

Each user account store 128 includes user role information 128a and user device information 128b, which together define specific aspects of the portal to which the user has access and information about the device(s) by which the user accesses the portal. For example, when the user connects to the portal using the mobile device 140, the enterprise portal system/server 120 can access the user role information 128a to determine the user's roles within the enterprise system (e.g., manager, procurer, accountant, etc.). At the same time, the enterprise portal system/server 120 can access the user device information 128b to determine information about the user's mobile device 140, such as the type of device (e.g., smart phone, tablet computing device, personal data assistant (PDA), desktop computer, laptop/notebook computer, wireless data port, etc.) and the device's specifications (e.g., processor speed, operating system, etc.).

Portal content 114 can be considered the target of a request for data in an enterprise portal, for example, an enterprise portal page, a Web page, or the final destination of a navigation action, etc. For the purposes of this disclosure, portal content 114 and an enterprise portal page may be used interchangeably. Each page of portal content 114 logically includes content 115 and possible links 116.

Content 115 is the textual, visual or aural content that is encountered as part of the user experience when accessing portal content 114 within an enterprise portal. The content 115 that the user sees, for example, is provided by the enterprise portal system/server 120 and is based on an identification of the user, one or more roles associated with the user, and the user's device (e.g., the mobile device 140). The content 115 may include, among other things, text, images, sounds, videos and animations. While illustrated as integrated with memory 124 of the enterprise portal server in the example environment 100 of FIG. 1, in alternative implementations, the content 115 source can be external to the enterprise portal system/server 120 and/or from the example environment 100, or internal to the portal content 114.

The possible links 116 may include, for example, one or more links that, when activated, launch a native application 147 for execution on the mobile device 140. Different link variations may be served for the same purpose, but for different devices. For example, a link that is associated with a spreadsheet application may be slightly different depending on the user's device, such as Spreadsheet App 1 on a tablet device and Spreadsheet App 2 on a smartphone. Also, links may only be provided if the user's role allows those links to be presented, and a specific version of the link can depend on the user's role(s).

The error handling instructions 125 can include rules and corrective information for correcting issues identified by the link handler. The native application determination module 123 can access the rules, for example, to determine which corrective information to provide based on the native application 147 associated with a particular link or attempted execution. The corrective information can include textual instructions to be provided to the user to resolve or correct the issue associated with initiating the native application 147. The corrective information can also include suggested link(s) for where native applications can be downloaded to the mobile device 140. Those suggested links may be associated with one or more locations within an appropriate system, such as a particular native application 132 within one of the application store systems 130, or a particular downloadable native application 127 within or otherwise associated with the enterprise portal system/server 120.

The illustrated environment of FIG. 1 also includes the mobile device 140, or multiple mobile devices 140. The mobile device 140 may be any computing device operable to connect to, or communicate with, at least the enterprise portal system/server 120 via the network 102 using a wire-line or wireless connection. In general, the mobile device 140 comprises an electronic computer device operable to receive, transmit, process, and store any appropriate data associated with the environment 100 of FIG. 1. While examples herein primarily describe downloading native applications (e.g., from an app store) to mobile devices, the mobile device 140 can also be any non-mobile device.

The illustrated mobile device 140 further includes a client application/browser 146. The client application/browser 146 is any type of application that allows the mobile device 140 to request and view content on the mobile device 140. In some implementations, the client application/browser 146 can be and/or include a Web browser. In some implementations, the client application/browser 146 can use parameters, metadata, and other information received at launch to access a particular set of data from the enterprise portal system/server 120. Once a particular client application/browser 146 is launched, a user may interactively process a task, event, or other information associated with the enterprise portal system/server 120. Further, although illustrated as a single client application/browser 146, the client application/browser 146 may be implemented as multiple client applications in the mobile device 140.

The illustrated mobile device 140 further includes an interface 152, a processor 144, and a memory 148. The interface 152 is used by the mobile device 140 for communicating with other systems in a distributed environment—including within the environment 100—connected to the network 102; for example, the enterprise portal system/server 120, as well as other systems communicably coupled to the network 102 (not illustrated). Generally, the interface 152 comprises logic encoded in software and/or hardware in a suitable combination and operable to communicate with the network 102. More specifically, the interface 152 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the mobile device 140 includes the processor 144. Although illustrated as the single processor 144 in FIG. 1, two or more processors 144 may be used according to particular needs, desires, or particular implementations of the environment 100. Each processor 144 may be a central processing unit (CPU), an application specific integrated circuit (ASIC), a field-programmable gate array (FPGA), or another suitable component. Generally, the processor 144 executes instructions and manipulates data to perform the operations of the mobile device 140. Specifically, the processor 144 executes the functionality required to send requests to the enterprise portal system/server 120 and to receive and process responses from the enterprise portal system/server 120.

The illustrated mobile device 140 also includes a memory 148, or multiple memories 148. The memory 148 may include any memory or database module and may take the form of volatile or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the mobile device 140. Additionally, the memory 148 may include any other appropriate data, such as VPN applications, firmware logs and policies, firewall policies, a security or access log, print or other reporting files, as well as others. While illustrated external to memory 148, one or more native applications 147 may be stored within the memory 148 and executed by the processor 144.

There may be any number of mobile devices 140 associated with, or external to, the environment 100. For example, while the illustrated environment 100 includes one mobile device 140, alternative implementations of the environment 100 may include multiple mobile devices 140 communicably coupled to the enterprise portal system/server 120 and/or the network 102, or any other number suitable to the purposes of the environment 100. Additionally, there may also be one or more additional mobile devices 140 external to the illustrated portion of environment 100 that are capable of interacting with the environment 100 via the network 102. Further, the term "client" and "user" may be used interchangeably as appropriate without departing from the scope of this disclosure. Moreover, while the mobile device 140 is described in terms of being used by a single user, this disclosure contemplates that many users may use one computer, or that one user may use multiple computers.

The illustrated mobile device 140 is intended to encompass any computing device such as a smart phone, tablet computing device, PDA, desktop computer, laptop/notebook computer, wireless data port, one or more processors within these devices, or any other suitable processing device. For example, the mobile device 140 may comprise a computer that includes an input device, such as a keypad, touch screen, or other device that can accept user information, and an output device that conveys information associated with the operation of the enterprise portal system/server 120 or the mobile device 140 itself, including digital data, visual information, or a GUI 142, as shown with respect to the mobile device 140.

Further, the illustrated mobile device 140 includes the GUI 142. The GUI 142 interfaces with at least a portion of the environment 100 for any suitable purpose, including generating a visual representation of a Web browser. In particular, the GUI 142 may be used to view and navigate various Web pages located both internally and externally to the enterprise portal system/server 120. The GUI 142 further generates a visual representation of native applications 147 and the client application/browser 146 that execute on the mobile device 140.

Figure 2:
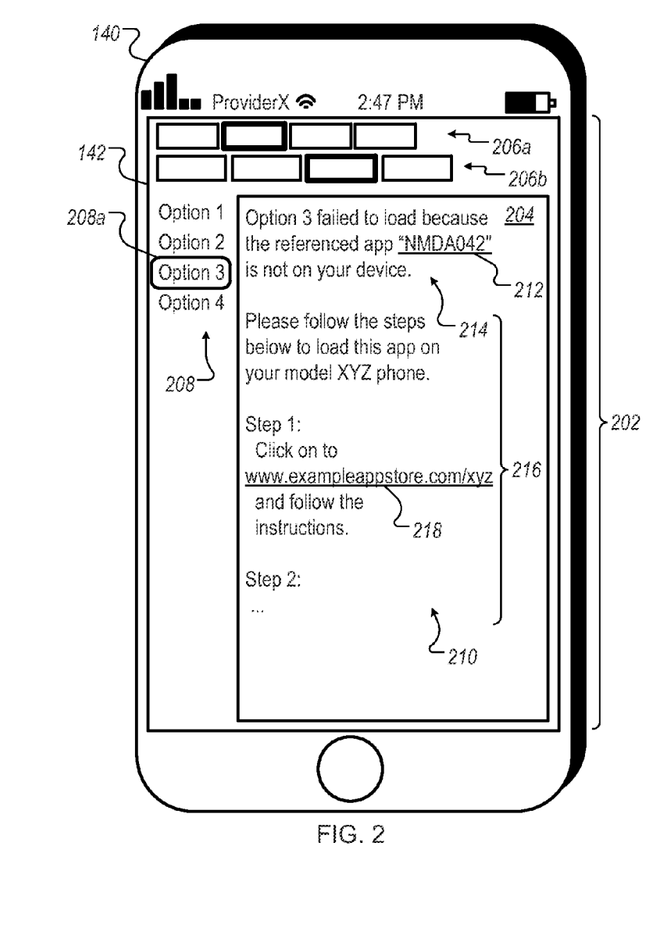
FIG. 2 shows an example enterprise portal page displayed on a mobile device.

FIG. 2 shows an example enterprise portal page 202 displayed on an example mobile device, illustrated here as mobile device 140 described in FIG. 1. For example, the illustrated enterprise portal page 202 includes a content area 204, plural option areas 206a-206b (e.g., two or more hierarchical option menus), and links 208. In this example, the links 208 are labeled "Option 1" through "Option 4," and each link is associated with a different native mobile device application, meaning that user selection of the link causes activation of the associated application. In some implementations, the user does not have an option as to which native application will launch. Instead, that determination is made automatically and independently by the enterprise portal system/server 120 based on the user, the user's role(s), the mobile device 140, and in association with the specific portal page being presented. Normally (e.g., when the link works), content presented within the content area 204 would correspond to a link that the user has selected from the links 208. In a different example, the entire enterprise portal page 202 may disappear completely behind the corresponding application (i.e., may move to the background of the operating system). However, in this example, information 210 displayed in the content area 204 indicates that an issue has occurred during activation of the native application associated with a user-selected link 208a (e.g., "Option 3").

For example, the information 210 that is displayed can be the result of the link handler 126 identifying an issue associated with activation of a native mobile device application 212 (e.g., "NMDA042") associated with the link user-selected 208a. For example, one type of issue that can occur is that the native application 147 (e.g., "NMDA042") is unavailable at the mobile device 140. In addition to identifying the missing application, the enterprise portal system/server 120 can use user device information 128b to identify the device type of the user's mobile device (e.g., mobile smart phone model XYZ) on which the failure occurred.

The information 210 also includes information for resolving the issue (e.g., displayed within the content area 204), which is displayed in the GUI 142 of the mobile device 140. The information 210 is configured to correct the failure on the mobile device 140, e.g., by providing information that the user can follow to download the missing application (e.g., "NMDA042"). In some implementations, the information 210 can include a corrective action message 214 that identifies the problem (e.g., including the missing native mobile device application 212) and instructions 216 for performing corrective action. In this example, the instructions 216 include at least one suggested link 218 that is selected, at least in part, based on the identified issue and the identified device type. For example, the instructions 216 can identify the suggested link 218 (e.g., www.exampleappstore.com) using error handling instructions 125 that correspond to the user's device type and the particular native application that is missing on the user's mobile device 140. In some instances, the suggested link 218 may represent a link, an indication, or other suitable instructions for the mobile device 140 to open an app store application within the mobile device 140 to a page or entry associated with the particular native application. In some implementations, selection of the suggested link 218 can navigate the user to a web site that corresponds to the particular application store system 130 from which the user can download the native application 132 corresponding to the missing application "NMDA042."

Figure 3:
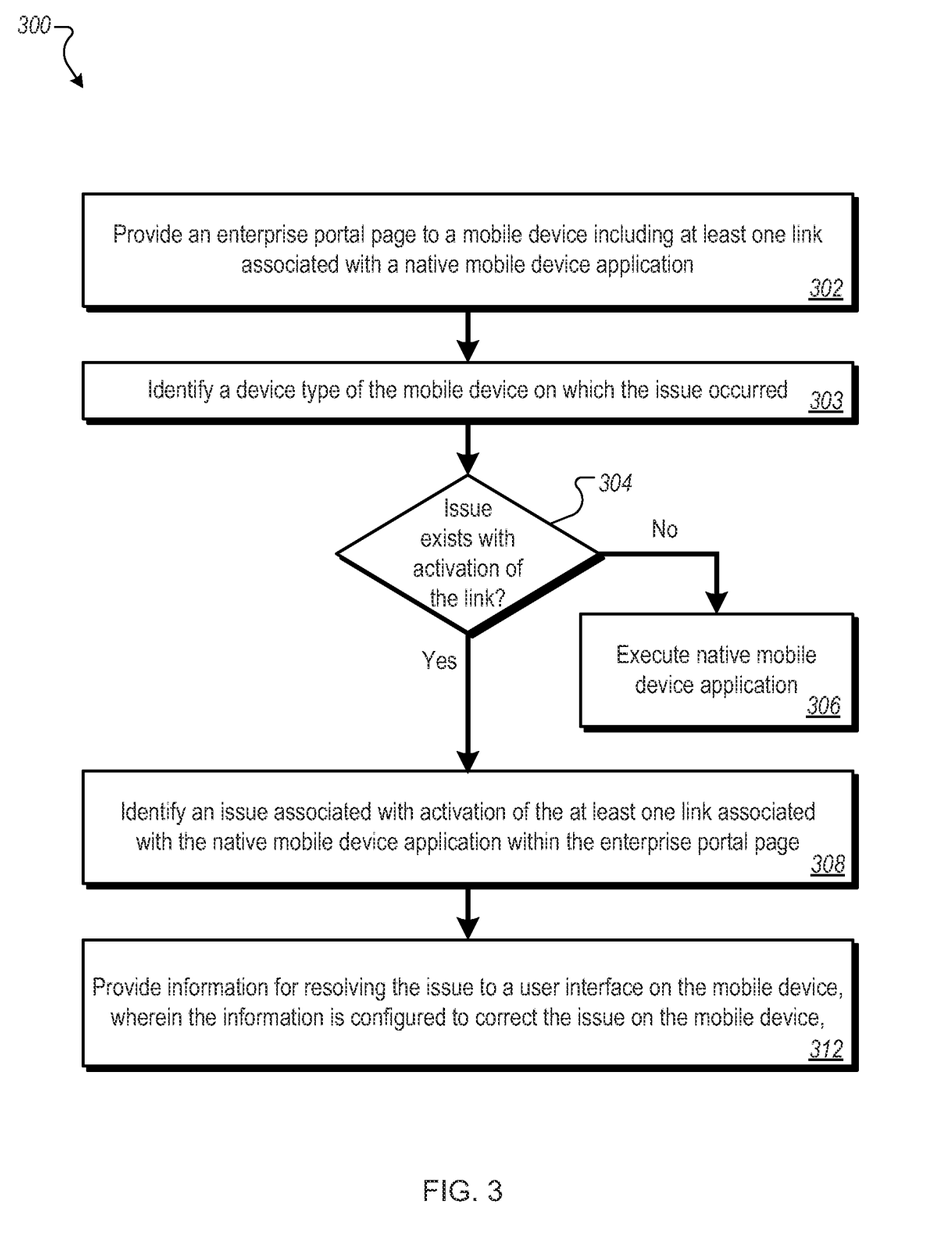
FIG. 3 is a flowchart of an example method for resolving an issue with a native mobile device application.

FIG. 3 is a flowchart of an example method 300 for resolving an issue with a native mobile device application. For clarity of presentation, the description that follows generally describes method 300 in the context of FIGS. 1 and 2. However, it will be understood that the method 300 may be performed, for example, by any other suitable system, environment, software, and hardware, or a combination of systems, environments, software, and hardware as appropriate. For example, the enterprise portal system/server 120 can be used to execute the method 300, e.g., during communication with the mobile device 140 and the application store system 130.

At 302, an enterprise portal page is provided to a mobile device including at least one link associated with a native mobile device application. For example, the enterprise portal page 202 can be displayed on the mobile device 140, and the user-selected link 208a can be associated with the mobile application "NMDA042."

In some implementations, the links initially provided are based at least in part on one or more roles of a user associated with the mobile device. For example, the links 208, including the user-selected link 208a, illustrated in FIG. 2, can be provided to the user based on the user's role(s) within the enterprise system (e.g., manager, procurer, accountant, etc.).

At 303, a device type of the mobile device on which the issue occurred is identified. For example, the link handler 126 can identify the device type (e.g., mobile smart phone model XYZ) for the user's mobile device 140 on which the failure occurred using information from the user device information 128b. In some implementations, step 303 can occur concurrently with step 302.

In some implementations, identifying the device type includes identifying a model of the device and a current operating system associated with the device. For example, the link handler 126 can also identify the operating system (e.g., "Version 7 of WXYZ") using information from the user device information 128b. In some implementations, the device type is identified upon the first interaction with the portal, e.g., passed or included as part of Hypertext Transfer Protocol (HTTP) headers in an HTTP request used in the first interaction.

At 304, a determination is made whether an issue exists with activation of the link. For example, when the user selects the user-selected link 208a to execute "Option 3," the link handler 126 can attempt to activate the associated native mobile device application "NMDA042." The link handler 126 can determine whether the activation occurs successfully, or if a problem exists with the activation, causing a failure.

At 306, if no issue exists, then the native mobile device application is executed. For example, the native mobile device application "NMDA042" can start execution on the mobile device 140, e.g., within the GUI 142.

At 308, if an issue exists, then the issue is identified that is associated with activation of the at least one link associated with the native mobile device application within the enterprise portal page. The issue results from the native application being unavailable at the mobile device. For example, the link handler 126 of FIG. 1 can determine that the issue associated with the failure in activating the native mobile device application "NMDA042" is because the application does not exist on the user's mobile device 140.

In some implementations, identifying the issue includes receiving an error within the portal page. For example, the error associated with the failed link can be intercepted by error handling that occurs within the link handler 126, which can provide an error message within the enterprise portal page 202, such the corrective action message 214 or some other message. If the enterprise portal page is written in JavaScript, the error may be passed through normal error handling messages or communication. Identified issues can typically include issues associated with an application typically not available at the mobile device. For example, the types of issues that the link handler 126 handles can primarily include issues associated with native applications not existing on a mobile device, e.g., "NMDA042" not being one of the native applications 147.

In some implementations, the issue identified can be related to a specific version of the native application that is needed for the portal page. For example, the portal page may need version 2.2, of the native application instead of version 2.1 currently on the user's mobile device 140, such as if new functionality available only with the newer version is needed for the uses associated with the portal page.

At 312, information for resolving the issue is provided to a user interface on the mobile device, where the information is configured to correct the issue on the mobile device. The information includes at least one suggested link for downloading the native mobile device application associated with the identified issue. The at least one suggested link is selected, at least in part, based on the identified issue and the identified device type. In some implementations, instead of providing information to the user for resolving the issue, operations of the enterprise portal system/server 120 can go directly to the application store system 130 (and/or the downloadable native applications 127) to automatically download the needed native application(s).

For example, the enterprise portal system/server 120 can use information from the error handling instructions 125 to produce the information 210 that is displayed in the content area of the GUI 142. The information 210 can include the corrective action message 214 and the instructions 216 that identify the suggested link 218 (e.g., www.exampleappstore.com/xyz) for downloading the missing application, where the specific identity of the suggested link 218 is chosen based on the user's device type and the particular native application that is missing on the user's mobile device 140. The suggested link 218, in this example, corresponds to an application store system 130 (e.g., www.exampleappstore.com) corresponding to the identified device type (e.g., including "/xyz" in the link). The application store system 130 in this example can be a location that is accessible within the enterprise portal (e.g., the enterprise portal system/server 120) or a related system. In some instances, the application store system 130 may be a local native application store at the enterprise portal system, where users can download the native applications for use with the enterprise portal.

In some implementations, the instructions 216 can be tailored to the device type, e.g., by identifying the type of device and providing instructions that are unique to that type of device. The information 210, including the instructions 216, can appear, for example, instead of displaying an error message that does not include steps for correcting the problem. In some implementations, downloading the native application can include using access rights to perform a corresponding download. For example, the mobile device 140 may be a security-protected smart phone, tablet or other mobile device provided by the user's employer, and the portal engine 122 can temporarily provide administrator and/or other privileges required to install the downloaded application.

In some implementations, the method 300 can further include determining information for resolving issues for each of plural combinations of native mobile device applications and device types, and storing the information at a time before the activation of the at least one link. For example, using device type information from the user device information 128*b* and native application information from the possible links 116, the enterprise portal system/server 120 populates the error handling instructions 125 for all possible issues. For example, the error handling instructions 125 can include instructions for downloading native applications for each combination of native application and device type (e.g., including model and operation system information). In some implementations, whenever a new device type is added to the user device information 128*b*, one or more entries in the error handling instructions 125 can be added. For example, an information technology support person associated with the portal system can use an interface to identify specific information about web sites or app stores for downloading the particular app.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the steps in these processes may take place simultaneously, concurrently, in parallel, and/or in different orders than as shown. Moreover, example environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
providing an enterprise portal page to a mobile device, the enterprise portal page including at least one link associated with a native mobile device application for execution on the mobile device, wherein the at least one link includes an instruction to trigger execution of the native mobile device application on the mobile device;
identifying an issue associated with activation, received at the mobile device, of the at least one link associated with the native mobile device application within the enterprise portal page, where the issue results from the native mobile device application not being installed at the mobile device when the activation is received;
identifying a device type of the mobile device on which the issue occurred, wherein identifying the device type includes identifying a model of the device and a current operating system associated with the device;
providing, using one or more processors, information for resolving the issue to a user interface on the mobile device, wherein the information is configured to correct the issue on the mobile device, the information including at least one suggested link for downloading the native mobile device application associated with the identified issue, wherein the at least one suggested link is selected, at least in part, based on the identified issue and the identified device type; and
providing, in response to activation of the at least one suggested link for downloading the native mobile device application associated with the issue, temporarily modified access rights to only allow the mobile device to perform a download of the native mobile device application corresponding to the activated at least one suggested link.

2. The method of claim 1 wherein identifying the issue includes receiving an error within the portal page.

3. The method of claim 1 wherein the information includes a corrective action message and instructions.

4. The method of claim 3 wherein the instructions are tailored to the device type.

5. The method of claim 1 wherein the identified issue is an issue associated with an application typically not available at the mobile device.

6. The method of claim 1 wherein providing information occurs instead of providing an error message, the error message not including information for resolving the issue.

7. The method of claim 1 wherein the at least one suggested link corresponds to an application store system corresponding to at least one of the identified device type.

8. The method of claim 1 wherein downloading the native mobile device application includes downloading from a location accessible within the enterprise portal or a related system.

9. The method of claim 1 wherein the links initially provided are based at least in part on one or more roles of a user associated with the mobile device.

10. The method of claim 1 further comprising:
determining information for resolving issues for each of plural combinations of native mobile device applications and device types; and
storing the information at a time before the activation of the at least one link; and
wherein, in response to identifying the issue, providing information for resolving the issue to the user interface on the mobile device includes providing information for resolving the issue based at least in part on the identified device type.

11. A computer-program product, the computer program product comprising computer-readable instructions embodied on tangible, non-transitory media, the instructions operable when executed by at least one computer to:
provide an enterprise portal page to a mobile device, the enterprise portal page including at least one link associated with a native mobile device application for execution on the mobile device, wherein the at least one link includes an instruction to trigger execution of the native mobile device application on the mobile device;
identify an issue associated with activation, received at the mobile device, of the at least one link associated with the native mobile device application within the enterprise portal page, where the issue results from the native mobile device application not being installed at the mobile device when the activation is received;
identify a device type of the mobile device on which the issue occurred, wherein identifying the device type includes identifying a model of the device and a current operating system associated with the device;
provide information for resolving the issue to a user interface on the mobile device, wherein the information is configured to correct the issue on the mobile device, the information including at least one suggested link for downloading the native mobile device application associated with the identified issue, wherein the at least one suggested link is selected, at least in part, based on the identified issue and the identified device type; and
providing, in response to activation of the at least one suggested link for downloading the native mobile device application associated with the issue, temporarily modified access rights to only allow the mobile device to perform a download of the native mobile device application corresponding to the activated at least one suggested link.

12. The computer-program product of claim 11 wherein identifying the issue includes receiving an error within the portal page.

13. The computer-program product of claim 11 wherein the information includes a corrective action message and instructions.

14. The computer-program product of claim 13 wherein the instructions are tailored to the device type.

15. A system, comprising:
   memory operable to store at least one enterprise portal page; and
   at least one hardware processor interoperably coupled to the memory and operable to perform instructions to:
     provide an enterprise portal page to a mobile device, the enterprise portal page including at least one link associated with a native mobile device application for execution on the mobile device, wherein the at least one link includes an instruction to trigger execution of the native mobile device application on the mobile device;
     identify an issue associated with activation, received at the mobile device, of the at least one link associated with the native mobile device application within the enterprise portal page, where the issue results from the native mobile device application not being installed at the mobile device when the activation is received;
     identify a device type of the mobile device on which the issue occurred, wherein identifying the device type includes identifying a model of the device and a current operating system associated with the device;
     provide information for resolving the issue to a user interface on the mobile device, wherein the information is configured to correct the issue on the mobile device, the information including at least one suggested link for downloading the native mobile device application associated with the identified issue, wherein the at least one suggested link is selected, at least in part, based on the identified issue and the identified device type; and
     providing, in response to activation of the at least one suggested link for downloading the native mobile device application associated with the issue, temporarily modified access rights to only allow the mobile device to perform a download of the native mobile device application corresponding to the activated at least one suggested link.

16. The system of claim 15 wherein identifying the issue includes receiving an error within the portal page.

17. The system of claim 15 wherein the information includes a corrective action message and instructions.

18. The system of claim 17 wherein the instructions are tailored to the device type.

\* \* \* \* \*